United States Patent
Kim

(10) Patent No.: US 9,052,750 B2
(45) Date of Patent: Jun. 9, 2015

(54) SYSTEM AND METHOD FOR MANIPULATING USER INTERFACE BY 2D CAMERA

(71) Applicant: Hyundai Motor Company, Seoul (KR)

(72) Inventor: Sung Un Kim, Yongin (KR)

(73) Assignee: HYUNDAI MOTOR COMPANY, Seoul (KR)

(*) Notice: Subject to any disclaimer, the term of this patent is extended or adjusted under 35 U.S.C. 154(b) by 22 days.

(21) Appl. No.: 14/092,411

(22) Filed: Nov. 27, 2013

(65) Prior Publication Data

US 2014/0168064 A1 Jun. 19, 2014

(30) Foreign Application Priority Data

Dec. 18, 2012 (KR) .................. 10-2012-0148814

(51) Int. Cl.
  G05D 1/02 (2006.01)
  G06F 3/03 (2006.01)
  G06F 3/01 (2006.01)
  G06F 3/042 (2006.01)

(52) U.S. Cl.
  CPC .............. *G06F 3/0304* (2013.01); *G06F 3/017* (2013.01); *G06F 3/042* (2013.01); *G05D 1/0246* (2013.01)

(58) Field of Classification Search
  CPC ....... G06F 3/011; G06F 3/017; G06F 3/0304; G06F 3/042–3/0428; G05D 1/0246–1/0253
  See application file for complete search history.

(56) References Cited

U.S. PATENT DOCUMENTS

| | | | |
|---|---|---|---|
| 2014/0152549 A1* | 6/2014 | Kim | 345/156 |
| 2014/0168061 A1* | 6/2014 | Kim | 345/156 |
| 2014/0184745 A1* | 7/2014 | Lv et al. | 348/46 |
| 2014/0267169 A1* | 9/2014 | Mckiel, Jr. | 345/175 |
| 2014/0333717 A1* | 11/2014 | Shin et al. | 348/36 |

FOREIGN PATENT DOCUMENTS

| | | | |
|---|---|---|---|
| KR | 10-0559365 B1 | | 3/2006 |
| KR | 10-0687737 B1 | | 2/2007 |
| KR | 1020080065032 A | * | 7/2008 |
| KR | 10-0862349 B1 | | 10/2008 |

* cited by examiner

*Primary Examiner* — Patrick F Marinelli
(74) *Attorney, Agent, or Firm* — McDermott Will & Emery LLP

(57) ABSTRACT

A method for manipulating a user interface by a 2D camera within a vehicle includes: receiving a captured image of a passenger and a captured image of the reflection of the passenger on a reflector; extracting real and virtual images of the passenger from the captured images, and recognizing a gesture by a correlation between the real and virtual images; and selecting a vehicle equipment operation corresponding to the recognized gesture. Accordingly, the passenger is able to manipulate the steering wheel with one hand and keep their eyes forward while controlling multiple in-vehicle electronic devices with simple motions with the other hand, thereby improving passengers' convenience and driving safety.

6 Claims, 3 Drawing Sheets

FIG. 3
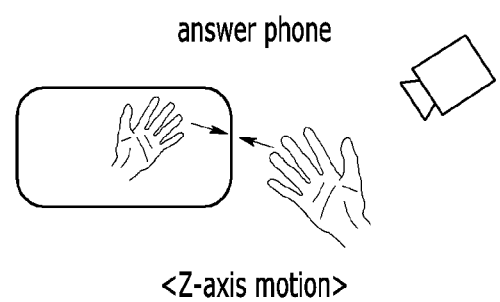
<Z-axis motion>
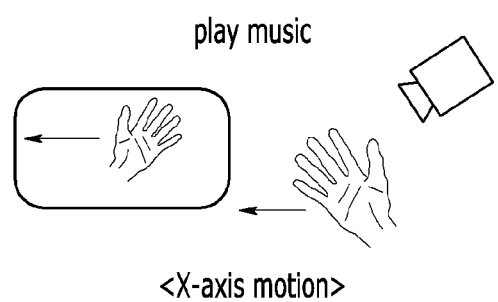
<X-axis motion>
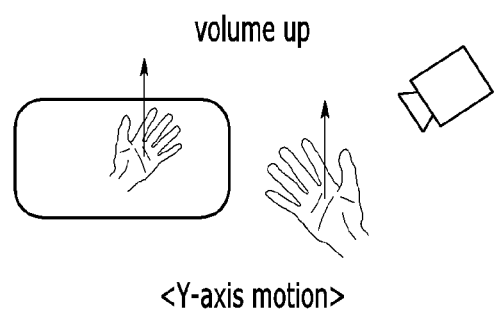
<Y-axis motion>

SYSTEM AND METHOD FOR MANIPULATING USER INTERFACE BY 2D CAMERA

CROSS-REFERENCE TO RELATED APPLICATION

This application claims priority to and the benefit of Korean Patent Application No. 10-2012-0148814 filed in the Korean Intellectual Property Office on Dec. 18, 2012, the entire contents of which are incorporated herein by reference.

TECHNICAL FIELD

The present disclosure relates to a system and a method for manipulating a user interface which controls in-vehicle equipment by recognizing a passenger's gesture by a 2D camera.

BACKGROUND

Modern vehicles are equipped with many electronic devices for passengers' convenience. These electronic devices include a navigation system, a hands-free mobile phone system, and so forth, as well as conventional electronic devices such as a radio and an air conditioner.

The conventional in-vehicle electronic devices provide a user interface through assigned buttons, and the use of a touch screen has been widespread in recent years. Passengers can manipulate these devices by directly touching them with their hands. However, such an operation based on passenger's eye sight and hand motion may hinder safe driving. Hence, there is a need to develop a user interface technology which does not hinder driving yet offers users convenience.

In order to solve this problem, an ultrasonic sensor was conventionally used to recognize hand's position and/or motion by distance and speed detection.

Moreover, the presence or absence of the hand and/or the position of the hand have been detected indirectly by interrupting an infrared beam with the hand or detecting a reflected signal.

A hand approaching within a close distance to an electronic device has been detected by electrically recognizing the proximity of the hand by an electrostatic capacitance sensor.

The technology for gesture recognition using the conductivity of a human body has been recently disclosed, which recognizes gestures by transmitting and receiving radio waves like an antenna.

However, the conventional method using the electrostatic capacitance sensor provides one-dimensional information only, such as distance, and can recognize some motions regardless of hand posture even if a plurality of sensors are used.

Also, even when using a 2D camera, such as a webcam, only a two-dimensional image seen by the camera is manipulated, thus making it difficult to measure the motion facing the camera.

The above information disclosed is only for enhancement of understanding of the background of the present disclosure and therefore it may contain information that does not form the prior art that is already known in this country to a person of ordinary skill in the art.

SUMMARY

The present disclosure has been made in an effort to provide a system and method which recognize a gesture from image information captured by a reflector and a 2D camera in a vehicle, and therefore control a variety of in-vehicle electronic devices.

A method for manipulating a user interface by a 2D camera in a vehicle includes:

receiving a captured image of a passenger and the captured image of the reflection of the passenger on a reflector; extracting real and virtual images of the passenger from the captured images, and recognizing a gesture by a correlation between the real and virtual images; and selecting a vehicle equipment operation corresponding to the recognized gesture.

The extracting of real and virtual images of the passenger from the captured images, and recognizing of a gesture by the correlation between the real and virtual images may include:

extracting real and virtual images of a passenger's hand from the captured image of the passenger; extracting an image of the passenger's hand from the captured image of the passenger; generating trajectories of the real and virtual images; and recognizing a gesture from the trajectories of the real and virtual images.

The recognizing of a gesture from the trajectories of the real and virtual images may include deciding whether a gesture matching the trajectories of the real and virtual images is stored in an information database; and if the matching gesture is stored in the information database, recognizing the trajectories of the real and virtual images as the gesture.

The method may further include determining whether there is a request to use a hand gesture recognition function prior to receiving of a captured image of the passenger, and if there is a request to use the gesture recognition function, a captured image of the passenger is received.

The method may further include determining whether there is a request to terminate the gesture recognition function, and if there is a request to terminate the gesture recognition function, terminating the gesture recognition function.

A system for manipulating a user interface by a 2D camera in a vehicle having a reflector includes:

an image taker for capturing an image of a passenger; an image storage for storing the image captured by the image taker; an information database storing recognizable gestures and corresponding vehicle equipment information; and an electronic control unit (also referred as an electronic controller herein) for controlling vehicle equipment operations based on an input signal from the image taker and accumulated image information stored in the image storage, wherein the electronic controller executes a series of commands for performing the method.

The system may further include a signal receiver for receiving a request signal from the passenger to use a gesture recognition function, and delivering the request signal to the electronic controller, and an output display for displaying the content of a vehicle equipment operation of the electronic controller.

According to the exemplary embodiment of the present disclosure, cost reduction can be achieved because a passenger's gesture can be extracted by a correlation between real and virtual images obtained by a 2D camera.

Moreover, according to the exemplary embodiment of the present disclosure, a 3D motion or gesture can be recognized without additional effort since the conventional 2D camera and the reflector in the vehicle are used.

Furthermore, according to the exemplary embodiment of the present disclosure, recognized 3D motions of up, down, left, and right motions of a hand enables a natural gesture of the passenger to operate the corresponding equipment, thereby leading to improved usability.

Accordingly, the passenger is able to manipulate a steering wheel with one hand and keep their eyes forward while controlling multiple in-vehicle electronic devices with simple motions of the other hand, thereby improving passengers' convenience yet driving safety.

BRIEF DESCRIPTION OF THE DRAWINGS

FIG. 3 is an illustration of an operation corresponding to a gesture in accordance with an exemplary embodiment of the present disclosure.

DETAILED DESCRIPTION OF THE EMBODIMENTS

An exemplary embodiment of the present disclosure will be described in detail hereinafter with reference to the accompanying drawings.

As those skilled in the art would realize, the described embodiments may be modified in various different ways, all without departing from the spirit or scope of the present disclosure.

Figure 1:
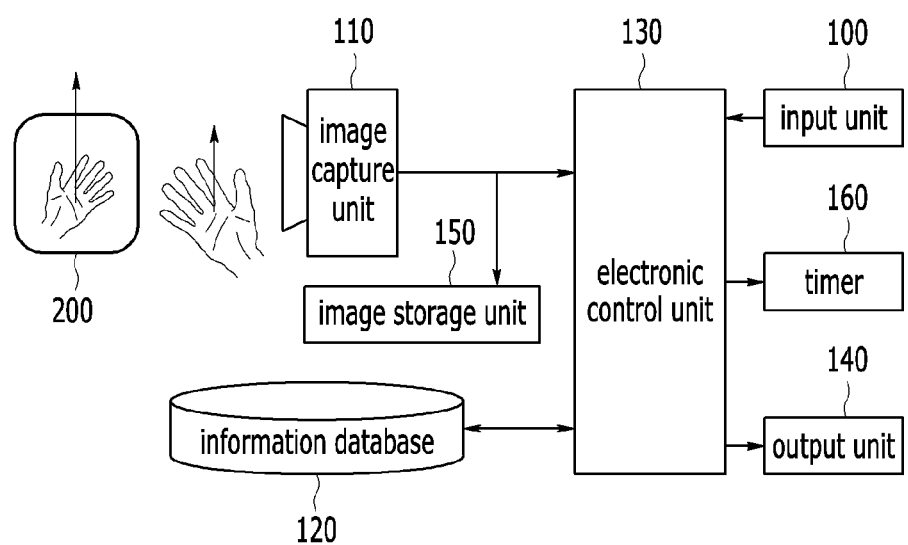
FIG. 1 is a view schematically showing a user interface system using a 2D camera in accordance with an exemplary embodiment of the present disclosure.

FIG. 1 is a view schematically showing a user interface system using a 2D camera in accordance with an exemplary embodiment of the present disclosure.

Referring to FIG. 1, a user interface (UI) system using a 2D camera includes a signal receiver 100, an image taker 110, an information database 120, a timer 160, an image storage 150, an electronic control unit (ECU) 130, and an output display 140.

The signal receiver 100 includes buttons, a touch screen, etc. Input, as used herein, refers to generating an input signal through a button or touch screen, and other input methods such as voice, gesture, etc can also be used.

The image taker 110 includes a 2D camera, an optical sensor, an ultrasonic sensor, an image sensor, and so on. The image taker 110 is capable of capturing a real image of a human body part and a virtual image reflected on a reflector 200 as a color image or a black-and-white image. The image taker 110 can be located next to, below, or above a steering wheel, so long as the image taker 110 is positioned to capture images of the human body including hands, legs, etc. of a user.

The reflector 200 may be a display, such as AVN, a windshield, a room mirror, interior of a center fascia, interior of a shift lever side, or an artificial mirror.

The image storage unit 150 may cumulatively store frames of images captured by the image taker 110, or store images processed in the electronic control unit 130.

The timer 160 checks time.

The information database 120 stores hand gestures corresponding to trajectories of real and virtual images of a variety of predefined human body parts. Moreover, the information database 120 stores equipment operating information corresponding to gestures, if required. For example, as shown in FIG. 3, vehicle equipment operations can be operated for various gestures, such as when a palm in the real and virtual images is approaching, the palm in the real and virtual images is moving left or moving up for answering the phone, play music while driving, stop music, music on/off, pause music, and air conditioner on/off.

The stored gestures are preferably preset for generally defined gestures.

The information database 120 stores gestures registered by the passenger. The passenger can select the trajectories of real and virtual images of a variety of human body parts and store them as gestures.

Each passenger is preferred to input the trajectories of real and virtual images of their own body part such as a hand so that the trajectories of real and virtual images of different body parts are recognized as hand gestures without an error.

The electronic control unit 130 extracts the real image of a hand and the virtual image of the hand reflected on the reflector 200 from images captured from the image taker 110. In this way, the trajectories of real and virtual images can be generated by repeating the extraction of real and virtual images and accumulating them.

Moreover, the trajectories of real and virtual images of the hand may be detected by comparing a current image frame with previous image frames stored in the image storage unit 150.

The method of generating the trajectories of real and virtual images can be modified in various ways, and other methods can be used to detect the trajectories of real and virtual images.

For example, the electronic control unit 130 may perform an image processing based on a human body image. That is, peripheral images are removed from real and virtual images of the passenger's body, and the head, torso, each arm, each hand, and each leg in the extracted image are separately modeled. The trajectories of the real and virtual images are detected from the modeled image of the hand.

Also, the electronic control unit 130 recognizes a gesture from the trajectories of real and virtual images created for a predetermined time by referring to the information database 120.

The predetermined time refers to a time required to form the trajectories of real and virtual images, which is enough to recognize a gesture, and can be checked by referring to the timer 160.

Also, the electronic control unit 130 decides whether a gesture matching the detected trajectories of the real and virtual images is stored in the information database 120. If there is a matching gesture, the electronic control unit 130 recognizes the trajectories of the real and virtual images as the gesture of the passenger. On the other hand, if no matching gesture is stored in the information database 120, the trajectories of the real and virtual images of the passenger's body are rendered unidentifiable and therefore not recognized.

The principle of gesture recognition using the correlation between real and virtual images is as follows.

For example, if a hand approaches the reflector 200, the real and virtual images become closer to each other, and if the hand is moving away from the reflector 200, the real and virtual images become distant from each other. A Z-axis motion is estimated based on the distance between the real image and the virtual image.

In the case of gestures such as up, down, left, right, and rotation, the distance between real and virtual images does not change much, and the real and virtual images are displaced in the same direction. Using this relationship, X- and Y-axis motions are estimated.

Moreover, the electronic control unit 130 determines whether to use a gesture recognition function according to an input signal from the signal receiver 100. That is, upon receiving an input signal for starting or terminating the gesture recognition function, the electronic control unit 130 controls the image taker 110 to start or terminate capturing the image.

At this time, the image taker 110 may be controlled to capture an activity area in which one hand of the user moves.

Moreover, the electronic control unit 130 selects a vehicle equipment operation corresponding to the recognized gesture.

The electronic control unit 130 generates a control signal according to the selected vehicle equipment operation and presents the operation that the passenger wants to perform. Examples of vehicle equipment operations that the passenger can select include switching channels/modes on AVN, answering/hanging up the phone, play/stop/mute music, volume up/down, air conditioner on/off, heater on/off, sun visor manipulation, and so on.

The output display 140 includes a touch screen, a speaker, and vehicle equipment to be operated, such as AVN, a mobile phone, a music player, an air conditioner, a heater, a sun visor, and a content display. The output display 140 displays the content of a vehicle equipment operation on the screen.

Figure 2:
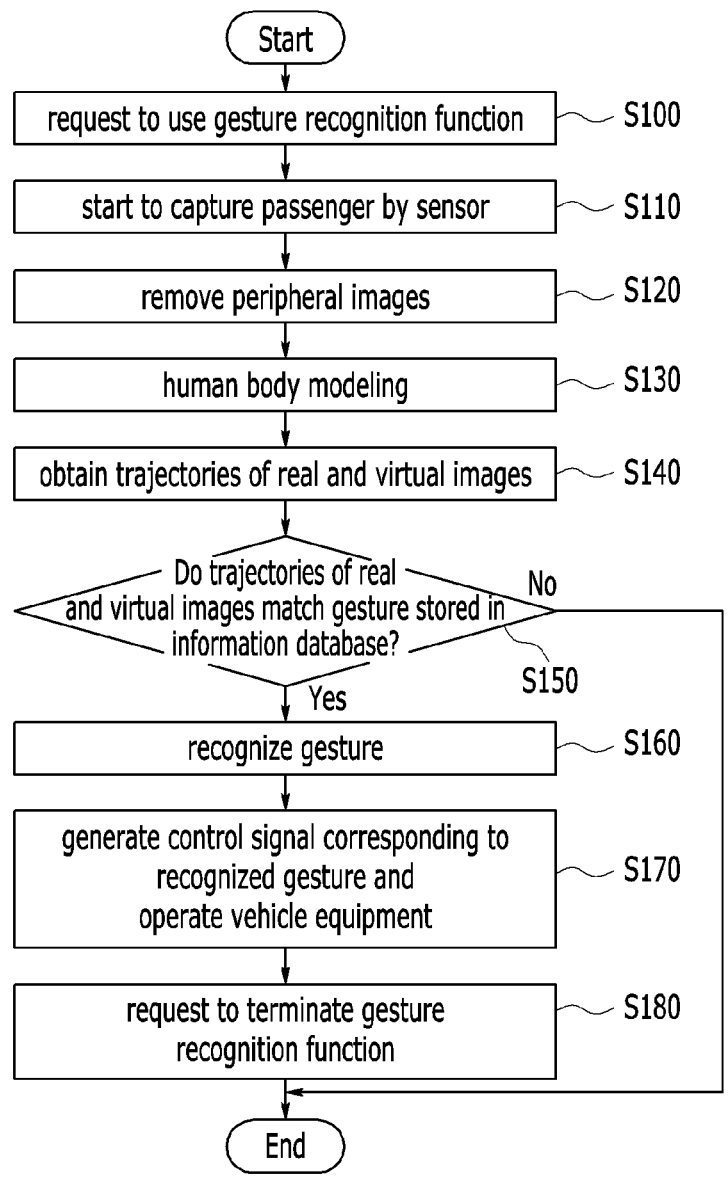
FIG. 2 is a sequential chart of a method for manipulating a user interface by a 2D camera within a vehicle in accordance with an exemplary embodiment of the present disclosure.

FIG. 2 is a sequential chart of a method for manipulating a user interface by a 2D camera in a vehicle in accordance with an exemplary embodiment of the present disclosure.

Referring to FIG. 2, a passenger sends a request to use the gesture recognition function through the signal receiver 100 (S100).

Then, upon receiving the request to use the gesture recognition function from the passenger, the electronic controller 130 starts to capture the passenger's body such as a hand by the image taker 110 (S110).

Next, the image captured by the image taker 110 is delivered to the electronic control unit 130, accumulated, and stored in the image storage 150.

The electronic control unit 130 removes peripheral images from the captured image of the passenger's body (S120). Also, the electronic control unit 130 separately models the torso, each arm, and each hand in the extracted image (S130), and tracks the image of the hand alone. Likewise, a virtual image reflected by the reflector 200 is tracked only for the hand.

Afterwards, the trajectories of the real and virtual images are extracted based on the real and virtual images of the hand (S140).

Such a method of extracting the trajectories of real and virtual images may be modified in various ways.

For example, the electronic control unit 130 extracts a real image of the hand and virtual image of the hand reflected on the reflector 200 from images input from the image taker 110. In this way, the trajectories of real and virtual images may be generated by repeating and accumulating the extraction of real and virtual images.

Moreover, the trajectories of real and virtual images of the hand may be detected by comparing the current image frame with the previous image frames stored in the image storage 150.

The electronic control unit 130 decides whether a gesture matching the detected trajectories of the real and virtual images of the hand is stored in the information database 120 (S150).

If the matching gesture is stored in the information database 130, the electronic control unit 130 recognizes the matching gesture as a gesture of the passenger S160.

Moreover, the electronic control unit 130 selects a vehicle equipment operation corresponding to the recognized gesture. The electronic control unit 130 generates a control signal according to the selected vehicle equipment operation, and presents the operation that the passenger wants to perform (S170).

Such vehicle equipment operations include operations of equipment, such as an in-vehicle air conditioner and an audio system, and are also applicable to the operations of delivering, duplicating, storing, and modifying information like content, media, etc.

An operation result is displayed through the output display 140, and the user interface using hand gesture recognition is finished if the driver sends a request to terminate the gesture recognition function (S180).

The exemplary embodiment of the present disclosure can accomplish cost reduction since a passenger's gesture can be extracted by a 2D camera.

While this present disclosure has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for manipulating a user interface by a 2D camera in a vehicle including:
    receiving a captured image of a passenger and a captured image of the reflection of the passenger on a reflector;
    extracting real and virtual images of the passenger from the captured images, and recognizing a gesture by correlation between the real and virtual images; and
    selecting a vehicle equipment operation corresponding to the recognized gesture,
    wherein the extracting of real and virtual images of the passenger from the captured images, and recognizing of a gesture by the correlation between the real and virtual images comprises:
        extracting real and virtual images of a passenger's hand from the captured image of the passenger;
        extracting an image of the passenger's hand from the captured image of the passenger;
        generating trajectories of the real and virtual images; and
        recognizing the gesture from the trajectories of the real and virtual images.

2. The method of claim 1, wherein the recognizing of the gesture from the trajectories of the real and virtual images comprises: deciding whether the gesture matching the trajectories of the real and virtual images is stored in an information database; and if the matching gesture is stored in the information database, recognizing the trajectories of the real and virtual images as a gesture.

3. The method of claim 1, further comprising
    determining whether there is a request to use a hand gesture recognition function, prior to the receiving of the captured image of the passenger, and
    if there is a request to use the gesture recognition function, the captured image of the passenger is received.

4. The method of claim 3, further comprising
    determining whether there is a request to terminate the gesture recognition function, and
    if there is a request to terminate the gesture recognition function, terminating the gesture recognition function.

5. A system for manipulating a user interface by a 2D camera within a vehicle having a reflector comprising:
    an image taker for capturing an image of a passenger;
    an image storage for storing the image captured by the image taker;
    an information database storing recognizable gestures and corresponding vehicle equipment information; and an electronic controller for controlling vehicle equipment operations based on an input signal from the image taker and accumulated image information stored in the image storage unit, wherein the electronic controller executes a series of commands for performing the method of:
 receiving a captured image of the passenger and a captured image of the reflection of the passenger on a reflector;
 extracting real and virtual images of the passenger from the captured images, and recognizing a gesture by correlation between the real and virtual images; and
 selecting a vehicle equipment operation corresponding to the recognized gesture,
 wherein the extracting of real and virtual images of the passenger from the captured images, and recognizing of a gesture by the correlation between the real and virtual images comprises:
  extracting real and virtual images of a passenger's hand from the captured image of the passenger;
  extracting an image of the passenger's hand from the captured image of the passenger;
  generating trajectories of the real and virtual images; and
  recognizing the gesture from the trajectories of the real and virtual images.

6. The system of claim 5, further comprising:

an signal receiver for receiving a request signal from the passenger to use a gesture recognition function, and delivering the request signal to the electronic controller; and an output display for displaying the content of a vehicle equipment operation of the electronic controller.

* * * * *